Nov. 14, 1950     A. P. BRIETZKE     2,529,832

INDICATOR MECHANISM

Filed Aug. 27, 1946

INVENTOR
ADRIAN P. BRIETZKE

*Bair & Freeman*

ATTORNEYS

Patented Nov. 14, 1950

2,529,832

UNITED STATES PATENT OFFICE 2,529,832

INDICATOR MECHANISM

Adrian Paul Brietzke, La Crosse, Wis., assignor to Northern Engraving & Manufacturing Co., La Crosse, Wis., a corporation of Wisconsin Application August 27, 1946, Serial No. 693,311

3 Claims. (Cl. 116—135)

This invention relates to indicator mechanisms for radios, time clocks, etc., in which rotary motion is converted to move an indicator linearly along a dial or scale, in a straight line path, or arcuately.

An object of the invention is the provision of an elongated indicator moving over a scale to simulate the fluid in a thermometer.

Another object is the provision of such an article which is adapted for use in connection with a thermostat control, to indicate temperature.

Another object of the invention is the provision of an indicator mechanism to simulate a thermometer in which there are a minimum of moving parts and which will not readily break or get out of order.

A further object is the provision of an indicator mechanism which is simple and economical to manufacture.

With these and other objects in view, my invention consists in the construction, arrangement and combination of the various parts of my device whereby the objects contemplated are attained, as hereinafter more fully set forth, pointed out in the claims and illustrated in the accompanying drawings, in which:

Fig. 6 is a view from the bottom of Fig. 4;

Figure 1:
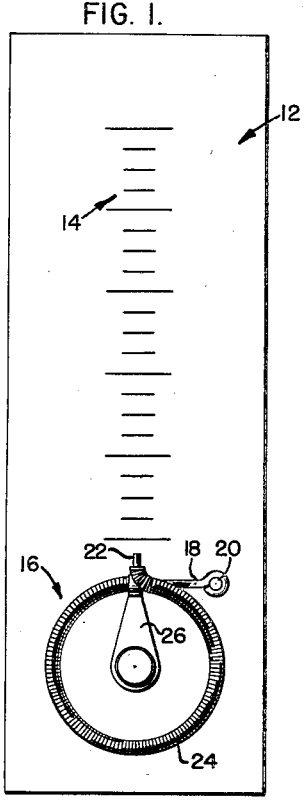
Fig. 1 is a front view of an indicator mechanism with the indicator element in retracted position.
Figure 2:
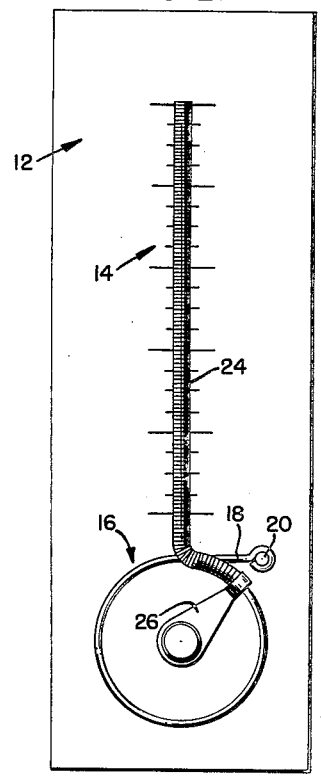
Fig. 2 is a view similar to Fig. 1 with the indicator element in extended position.
Figure 3:
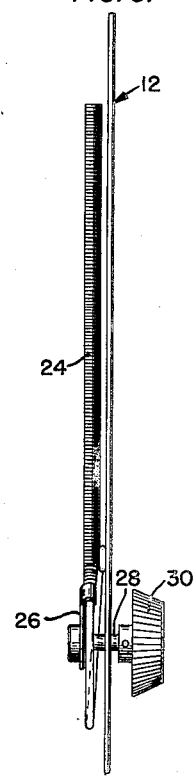
Fig. 3 is a view from the right of Fig. 2.

Referring in detail to the drawings, the mechanism shown in Figs. 1, 2, and 3 comprises a supporting member 12, which may be of any desired material such as plastic, and it may be transparent, if desired, for pleasing appearance. This supporting member may be a part of the apparatus with which the indicator is used.

A dial or scale 14 is formed on the face of the supporting member 12 with appropriate divisions. The dial 14 in this embodiment is shown in a vertical line, and below the dial is an actuating mechanism indicated in its entirety at 16, for actuating an indicator element cooperating with the scale 14.

The actuating mechanism 16 includes a wire guide 18, having an eyelet at one end, as shown at 20, and is secured to the supporting member 12 by means of the eyelet 20. The wire guide 18 is circular in form and is spaced slightly from the plane of the supporting member except at its point of securement at the eyelet 20. The extended end of the wire guide terminates at 22 in a straight portion disposed radially of the body of the guide.

The end 22 terminates adjacent the bottom end of the dial 14 and is disposed in a direction along the line of the dial.

An indicator element 24, in the form of a tightly coiled flexible spring, is fitted on the wire guide 18, and slidable thereon. A radius arm 26 is secured on a shaft 28, which is rotatably mounted in the supporting member 12 centrally of the circular wire guide 18, and is provided with an operating knob 30. The outer end of the radius arm 26 is secured to the inner end of the indicator element 24.

By rotating the radius arm 26 counter-clockwise, as shown in Fig. 1, the indicator element 24 slides on the wire guide 18, and the outer end of the indicator element rides off the extended end 22 of the wire guide 18 and follows along the dial 14. This position is shown in Fig. 2. Conversely, rotating the radius arm 26 in the opposite direction retracts the indicator element 24 from the dial 14 and slides it over the coiled portion of the wire guide 18.

The indicator element 24 possesses sufficient rigidity to sustain its own weight in extended vertical position. The extended arm 22 of the wire guide is just along enough to assure that the indicator element travels in the correct direction along the dial.

The indicator element 14 may be painted red to simulate the fluid in standard thermometers.

Thus the device is convenient and attractive for use in setting the operating limits of a thermostat control.

If desired, the indicator element 24 may be braided wire, instead of a coiled spring, and it is of such a diameter to slide easily over the wire guide 18. The wire guide may be of any desired cross-sectional contour.

Figure 5:
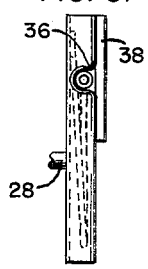
Fig. 5 is an end view, as viewed from the left of Fig. 4.
Figure 4:
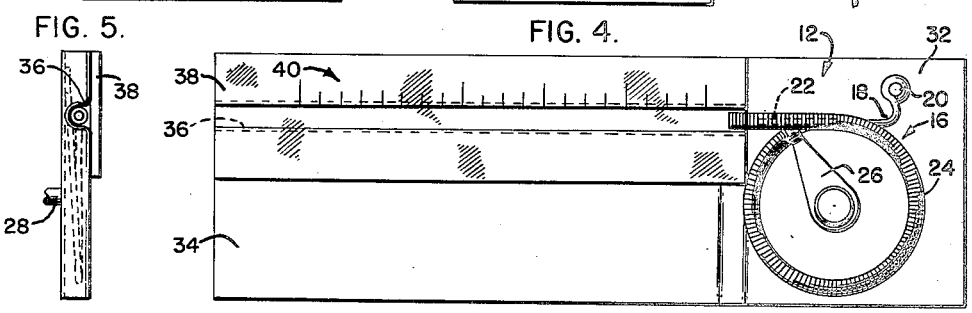
Fig. 4 is a front view of a modified form of indicator mechanism.

Figs. 4, 5, and 6 show a modified form of indicator mechanism and employs certain elements in common with the first form. These elements include a supporting member 12, actuating mechanism 16, wire guide 18, and radius arm 26. The indicator mechanism 16 operates similarly to that described in connection with the first form, although it is disposed to extend the indicator element horizontally instead of vertically.

In the present embodiment, the supporting member 12 is formed with two plane surfaces 32 and 34, offset with relation to each other. The actuating mechanism 16 is mounted on the surface 32, and the surface 34 is disposed at about the top of the actuating mechanism. A channel 36 is formed in the surface 34, being approximately an extension of the surface 32. A glass plate or other transparent piece 38 is placed over the channel 36. A scale 40 is formed either on the plate 38 or on the surface 34 of the supporting member, as desired. The extended end 22 of the wire guide in this modification (Figure 4) terminates adjacent the end of the channel 36. On rotation of the radius arm 26, the indicator element 24 is slid off the wire guide and into the channel 36, which serves to guide the indicator element.

Figures 7, 8:
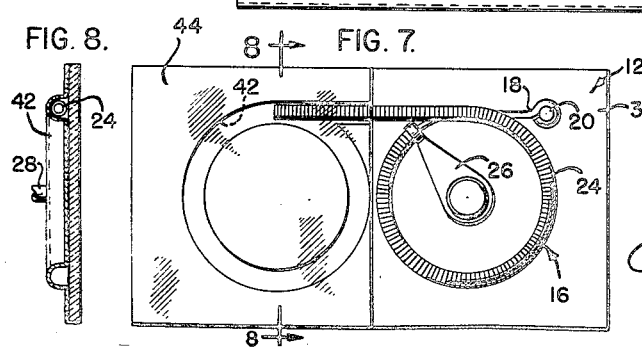
Fig. 7 is a front view of a second modification.
Fig. 8 is a view taken on line 8—8 of Fig. 7.

The form shown in Figs. 7 and 8 is similar to the form shown in Fig. 4, but includes a circular channel 42 for guiding the indicator element 24. A glass plate or other transparent plate 44 covers the channel 42 and may be provided with a scale if desired, similarly to the previous embodiment.

While I have shown the particular embodiments of my invention, it will be understood of course that I do not wish to be limited thereto since many modifications may be made, and I therefore contemplate by the claims appended hereto to cover any such modifications or substitutions of equivalents as fall within the true spirit and scope of my invention.

I claim:

1. An indicator mechanism, comprising a rigid, substantially plane surface supporting member, a vertical dial marking thereon, a substantially rigid wire guide having one end rigidly secured to said supporting member, substantially the remainder of said wire guide being spaced from the plane of said supporting member, the extended end of said wire guide being positioned at and terminating adjacent the lower end of said dial marking and disposed in a line parallel with the plane of said supporting member and directed in the direction of said dial marking, a flexible tubular member surrounding and slidable on said wire guide, said flexible tubular member having sufficient rigidity as to normally sustain itself in straight line form in vertical position and in the absence of applied pressure, and operating means mounted on said supporting member and connected to said flexible member for sliding it on said wire guide and extending it off of and beyond the extended end of said wire guide, whereby said flexible tubular member when extended forms an extension of said extended end of said wire guide and is adapted to follow along said dial marking.

2. An indicator mechanism, comprising, a rigid, substantially plane surface supporting member, a vertical dial marking thereon, a substantially rigid, circular wire guide having one end rigidly secured to said supporting member, substantially the remainder of said circular wire guide being spaced from the plane of said supporting member, the extended end of said circular wire guide being positioned at and terminating adjacent the lower end of said dial marking and disposed in a line parallel with the plane of said supporting member and directed in the direction of said dial marking, a flexible tubular member surrounding and slidable on said circular wire guide, said flexible tubular member having sufficient rigidity as to normally sustain itself in straight line form in vertical position and in the absence of applied pressure, and an arm rotatably mounted in said supporting member and having its swingable end connected to said flexible member for sliding it on said circular wire guide and extending it off of and beyond the extended end of said circular wire guide, whereby said flexible tubular member when extended forms an extension of said extended end of said wire guide and is adapted to follow along said dial marking.

3. An indicator mechanism, comprising, a rigid, substantially plane surface supporting member, a vertical dial marking thereon, a substantially rigid, circular wire guide having one end rigidly secured to said supporting member, substantially the remainder of said circular wire guide being spaced from the plane of said supporting member, the extended end of said circular wire guide being positioned at and terminating adjacent the lower end of said dial marking and disposed in a line parallel with the plane of said supporting member and directed in the direction of said dial marking, a flexible helically coiled spring surrounding and slidable on said circular wire guide, said flexible tubular member having sufficient rigidity as to normally sustain itself in straight line form in vertical position and in the absence of applied pressure, and an arm rotatably mounted in said supporting member and having its swingable end connected to said coiled spring for sliding it on said circular wire guide and extending it off of and beyond the extended end of said circular wire guide, whereby sai flexible tubular member when extended forms an extension of said extended end of said wire guide and is adapted to follow along said dial marking.

ADRIAN PAUL BRIETZKE.

REFERENCES CITED

The following references are of record in the file of this patent:

UNITED STATES PATENTS

| Number | Name | Date |
|---|---|---|
| 2,232,057 | Faller et al. | Feb. 18, 1941 |

FOREIGN PATENTS

| Number | Country | Date |
|---|---|---|
| 432,021 | Great Britain | July 15, 1935 |
| 451,146 | Great Britain | July 30, 1936 |
| 846,027 | France | Sept. 7, 1939 |